(12) United States Patent
Wang et al.

(10) Patent No.: US 6,670,794 B1
(45) Date of Patent: Dec. 30, 2003

(54) MULTI-PHASE DC-TO-DC BUCK CONVERTER WITH MULTI-PHASE CURRENT BALANCE AND ADJUSTABLE LOAD REGULATION

(75) Inventors: Hung-I Wang, Changhua (TW); Shwu-Liang Hsieh, Taichung (TW); Liang-Pin Tai, Tainan (TW); Jing-Meng Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 10/193,119

(22) Filed: Jul. 12, 2002

(51) Int. Cl.$^7$ .................................................. G05F 1/70
(52) U.S. Cl. ........................ 323/213; 323/246; 323/285
(58) Field of Search ................................ 323/212, 213, 323/217, 218, 219, 237, 246, 259, 222, 223, 282, 285, 288; 363/65

(56) References Cited

U.S. PATENT DOCUMENTS

| 6,366,062 B2 | * | 4/2002 | Baretich et al. ............. 323/223 |
| 6,388,429 B1 | * | 5/2002 | Mao ........................... 323/222 |
| 6,476,589 B2 | * | 11/2002 | Umminger et al. ......... 323/282 |

* cited by examiner

Primary Examiner—Jessica Han
(74) Attorney, Agent, or Firm—Rosenberg, Klein & Lee

(57) ABSTRACT

To balance the current of individual channel as well as regulate the output voltage for a multi-phase DC-to-DC buck converter, the converter output voltage is sensed and compared with a reference signal to produce a first error signal serving as first control signal for PWM signals of the converter and the channel currents are sensed, summed, averaged and subtracted to produce second error signals that are further modified by saw-tooth wave signal to produce second control signals for the PWM signals. Moreover, the reference signal is controlled by the summed channel currents for adjustable load regulation.

8 Claims, 7 Drawing Sheets

MULTI-PHASE DC-TO-DC BUCK CONVERTER WITH MULTI-PHASE CURRENT BALANCE AND ADJUSTABLE LOAD REGULATION

FIELD OF THE INVENTION

The present invention relates generally to a multi-phase DC-to-DC buck converter, and more particularly, to an apparatus and method for multi-phase current balance and adjustable load regulation for a multi-phase DC-to-DC buck converter.

BACKGROUND OF THE INVENTION

The multi-phase DC-to-DC buck converter has been widely used for power supply circuits. In a multi-phase DC-to-DC buck converter, there are several pairs of switches of which each pair of switches is controlled by a respective pulse width modulation (PWM) signal with phase shift but generate a single output voltage, i.e., the converter output voltage. Unfortunately, there may be current unbalance occurred between the different phases or channels thereof due to the mismatching of parameters in the multi-phase DC-to-DC buck converter. For multi-phase current balance, a prior art converter disclosed by U.S. Pat. No. 6,278,263 issued to Walters et al. equally shares the load current between each of the phases or channels in the converter by averaging all of the channel currents with summing circuit and scaling circuit for balance control between the channels in addition to the comparison of the converter output voltage with a reference voltage to generate each PWM signal for the respective channel. However, this prior art circuit regulates each PWM signal by combining the differential voltage, between the converter output voltage and a reference voltage with the differential current between the corresponding channel current and the average channel current to generate the feedback control signal of the PWM comparator whose another input is connected with a ramp voltage to be compared with the control signal, and that makes the balance control complicated since the converter output voltage dependent control and the channel current dependent control are integrated into a control signal for the PWM comparator. Moreover, a constant reference voltage for comparison with the converter output voltage cannot be adaptive to load variations. For example, when the load of the converter changed, the droop of the converter output voltage is also changed, which degrades the performance of the converter and may result in large transient ripples. It is therefore desired improved multi-phase current balance and adjustable load regulation for a multi-phase DC-to-DC buck converter.

SUMMARY OF THE INVENTION

One object of the present invention is a multi-phase DC-to-DC buck converter with multi-phase current balance and the balance control method thereof.

Another object of the present invention is a multi-phase DC-to-DC buck converter with adjustable load regulation and the regulation control method thereof.

Yet another object of the present invention is to improve the control of the PWM signals for operating the switches of each channel in a multi-phase DC-to-DC buck converter.

In a multi-phase DC-to-DC buck converter, according to the present invention, for each channel there is a PWM comparator with two inputs for respectively receiving two control signals, one of which is derived from the feedback of the converter output voltage and the other is derived from the feedback of the corresponding channel current, and one output for producing a PWM signal for the corresponding channel. For the first feedback signal, the converter output voltage is sensed and compared with a reference signal to generate a first error signal serving as the first control signal of the PWM comparator. For the second feedback signal, the corresponding channel current is sensed and compared with the average of all the channel currents to generate a second error signal for the corresponding channel, and then the second error signal is injected into a ramp signal to either shift the DC offset of the ramp signal or increase or decrease the amplitude of the ramp signal for serving as the second control signal of the PWM comparator. This manner the excess channel current will be cut by reducing the ON-duty of the PWM comparator and the insufficient channel current will be raised by increasing the ON-duty of the PWM comparator. As a result, the unbalance between channel currents is corrected. For the adjustable load regulation, the reference signal to be compared with the converter output voltage is controlled by the summed channel current.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
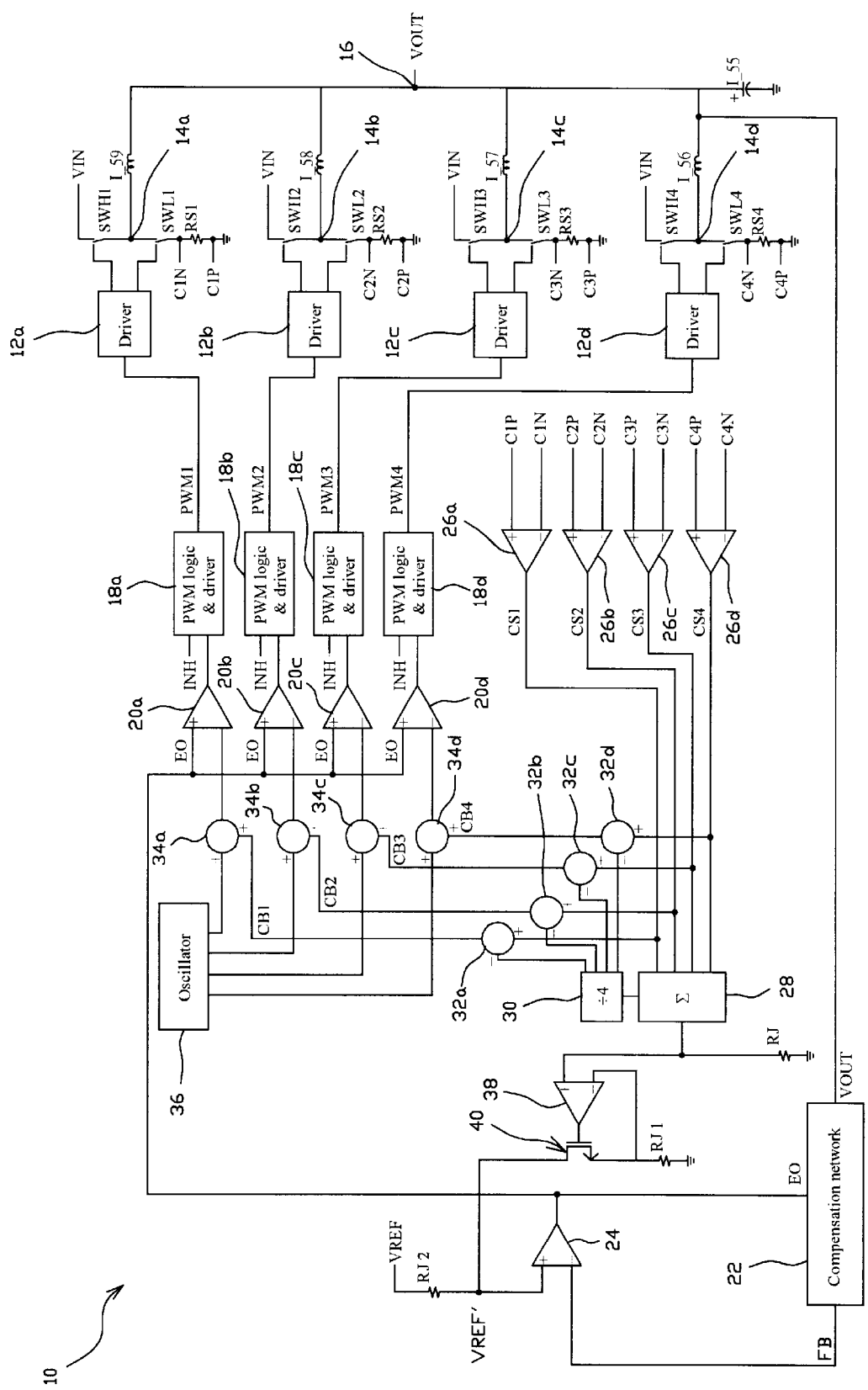
FIG. 1 shows a four-phase DC-to-DC buck converter according to the present invention.

To illustrate the features and advantages of the present invention, a four-phase converter is shown in FIG. 1. The converter 10 has four driver 12a, 12b, 12c, and 12d to operate four pairs of switches SWH1 and SWL1, SWH2 and SWL2, SWH3 and SWL3, and SWH4 and SWL4 each pair of them connected between a converter input voltage VIN and ground. These four output stages have their respective phase output nodes 14a, 14b, 14c, and 14d to be combined together and derived a converter output voltage VOUT on a converter output node 16. The four switch drivers 12a, 12b, 12c, and 12d are operated by four PWM signals PWM1, PWM2, PWM3, and PWM4 generated by four PWM logics and drivers 18a, 18b, 18c, and 18d each of them has two inputs connected to signal INH and output of PWM comparators 20a, 20b, 20c, or 20d. Each of the four PWM comparators 20a, 20b, 20c, and 20d has two inputs to receive two control signals, one of them is derived from regulation of the converter output voltage VOUT and the other is derived from unbalance of respective channel current. Generations of these two control signals for the PWM comparators 20a, 20b, 20c, and 20d and the way they control the converter 10 will be described respectively.

For the first control signal in connection with the converter output voltage VOUT, the converter output voltage VOUT is sensed and provided to a compensation network 22 to produce a feedback signal FB that is then provided to an error amplifier 24 to be compared with a reference voltage VREF' to generate an error signal EO transferred to each of the PWM comparators 20a, 20b, 20c, and 20d, i.e., the error signal EO is the first control signal and one of the two inputs of each of the PWM comparators 20a, 20b, 20c, and 20d.

Figures 2A, 2B:
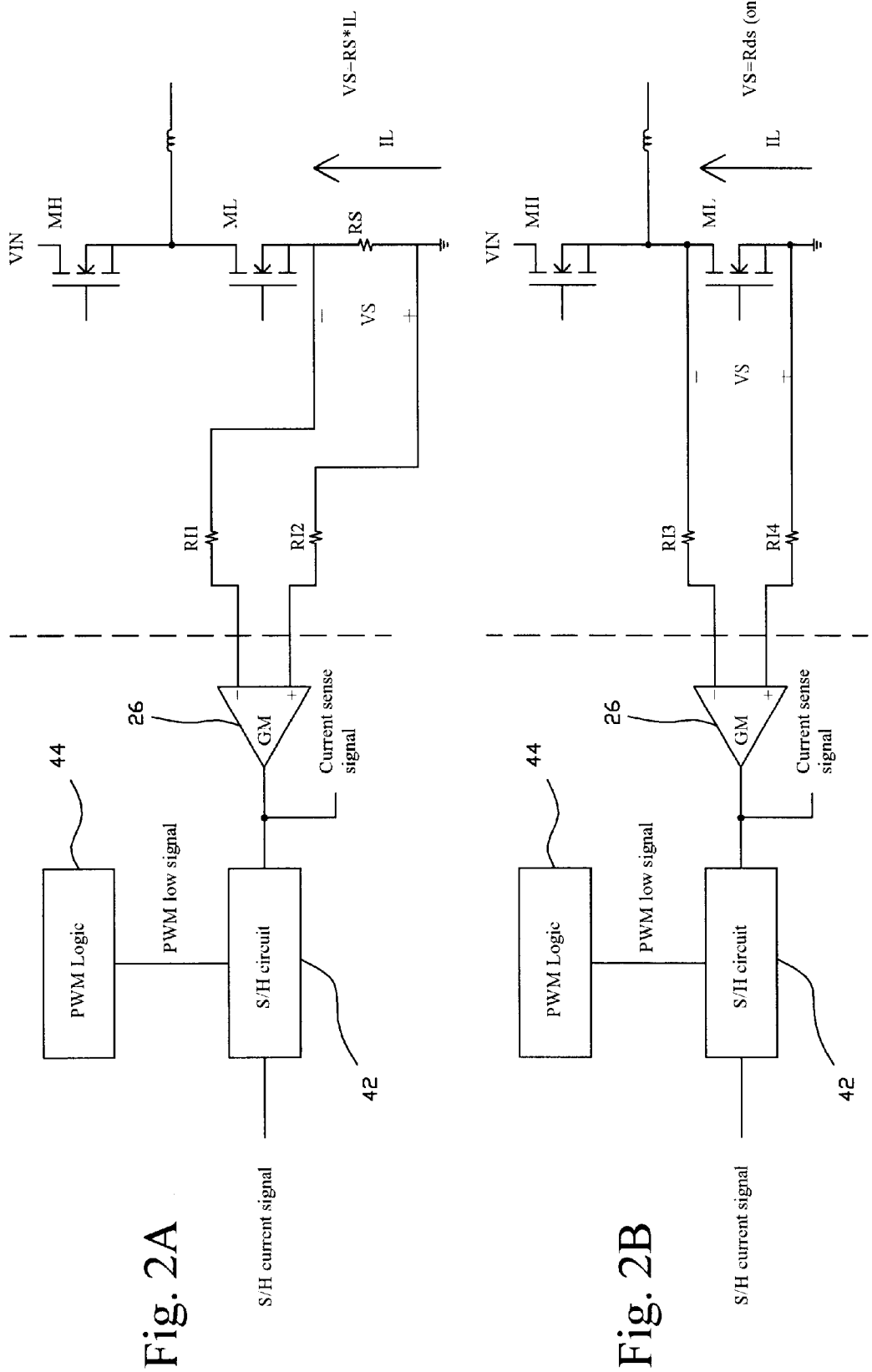
FIGS. 2A and 2B show two embodiment current sense circuits for the converter 10 shown in FIG. 1.

For the second control signal in connection with current unbalance between the four channels, each channel current is sensed and further averaged and compared with the average current to obtain and feedback the differential current for regulate the PWM comparators 20a, 20b, 20c, and 20d. In this embodiment four current sense resistors RS1, RS2, RS3, and RS4 are inserted between ground and low-side switches SWL1, SWL2, SWL3, and SWL4, respectively. The voltage drops across these four current sense resistors RS1, RS2, RS3, and RS4 are transformed to four respective current sense signals CS1, CS2, CS3, and CS4 by four differential input GM amplifiers or transconductive amplifiers 26a, 26b, 26c, and 26d. The current sense circuit is illustrated more detailed in FIG. 2 with single channel. As shown in FIG. 2A, two MOS transistors MH and ML serve as the high-side and low-side switches connected between converter input voltage VIN and ground, and current sense resistor RS is connected between the low-side MOS transistor ML and ground. When channel current IL flows through the current sense resistor RS, a voltage drop VS=RS×IL across the current sense resistor RS will be transformed to current sense signal by the differential input GM amplifier 26. A sampling and holding circuit 42 under control of the PWM low signal from the PWM logic 44 receives the current sense signal to produce a sampled and held current signal representative of the channel current IL. The voltage drop VS is measured during the synchronous rectifying switch is turned on, and the output of the differential input GM amplifier 26 is sampled at the low-side MOS transistor ML is turned off. Alternatively, in FIG. 2B the ON-resistance of the low-side MOS transistor ML is used for the current sense resistor, and thus the drain and source of the low-side MOS transistor ML are connected to the differential input GM amplifier 26 for production of the current sense signal. In this manner, the voltage drop VS across the current sense resistor is Rds(on)×IL, where Rds(on) is the ON-resistance of the low-side MOS transistor ML.

Figure 3:
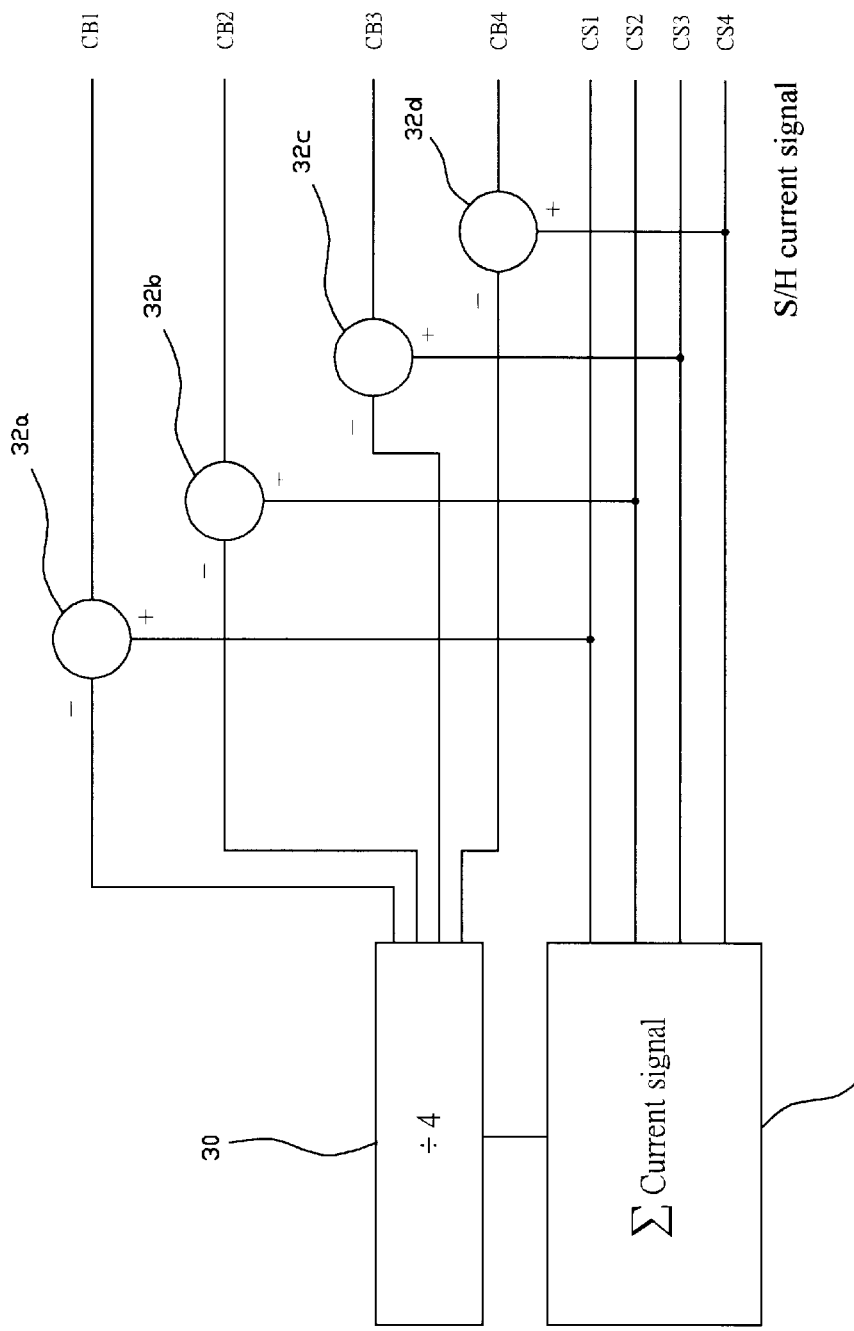
FIG. 3 shows an embodiment circuit to generate the channel balance correction signals for the converter 10 shown in FIG. 2.

Referring to FIG. 1, a summing circuit 28 sums the current sense signals CS1, CS2, CS3, and CS4 from the four differential input GM amplifiers 26a, 26b, 26c, and 26d, and then the total channel current is averaged by a scaling circuit or averaging circuit 30. The current balance reference is the average channel current generated by the averaging circuit 30. Four subtracting circuits 32a, 32b, 32c, and 32c receive the average channel current from the averaging circuit 30 and subtract the average channel current from the corresponding current sense signals CS1, CS2, CS3, and CS4 to produce four error signals CB1, CB2, CB3, and CB4 for the respective channels. The correction signals for channel current balance are the difference between the average current and each channel current that is represented by the four error signals CB1, CB2, CB3, and CB4. The circuit to generate these four error signals CB1, CB2, CB3, and CB4 is enlarged in FIG. 3 for more clearly illustration.

Figure 4:
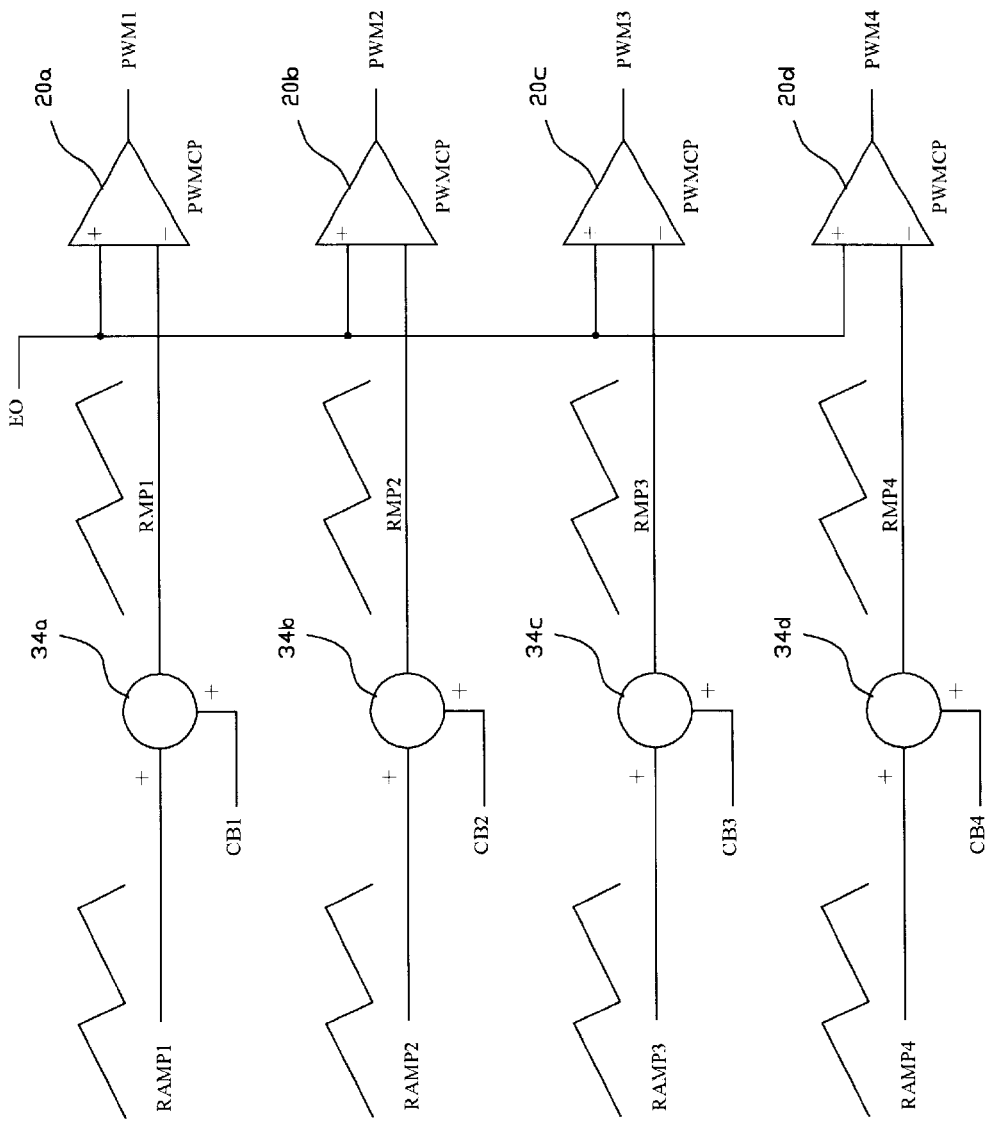
FIG. 4 shows the injections of the channel balance correction signals into respective ramp signals for the converter 10 shown in FIG. 2.
Figure 5:
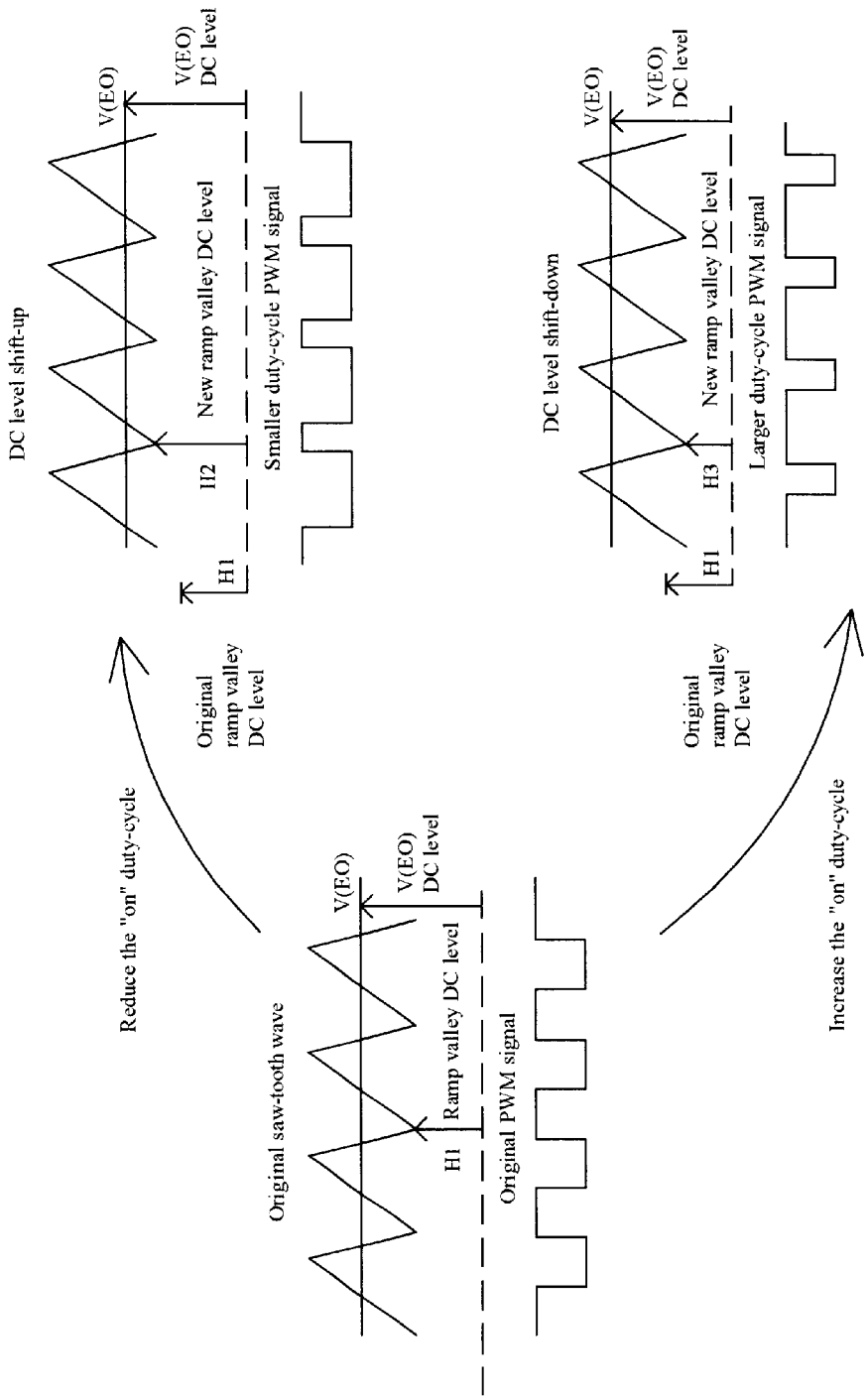
FIG. 5 shows the methodology that the correction signal shifts the DC offset of the ramp signal according to the present invention.
Figure 6:
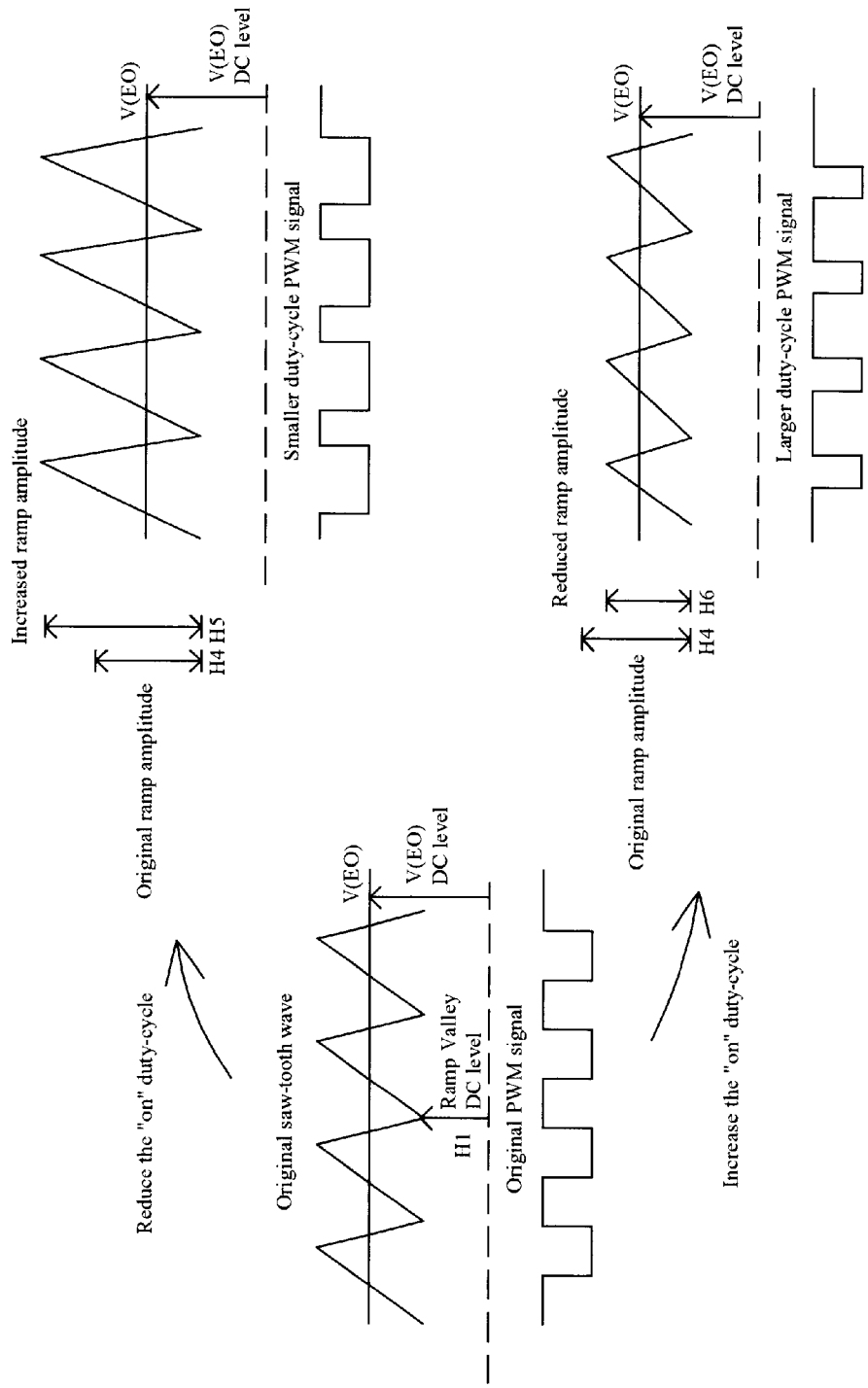
FIG. 6 shows the methodology that the correction signal scales the amplitude of the ramp signal according to the present invention.

It is noted that the feedback signals derived from the error between each of the channel currents and their average are not mixed with the feedback signal derived from the error between the converter output voltage VOUT and the reference signal VREF', they are two separate control factors for the PWM comparators 20a, 20b, 20c, and 20d. Referring to FIG. 1, the correction signals for channel current balance CB1, CB2, CB3, and CB4 are added to ramp signals generated by oscillator 36 by four summing circuits 34a, 34b, 34c, and 34d whose outputs are connected to the PWM comparators 20a, 20b, 20c, and 20d to serve as second control signals. A more clear vision is shown in FIG. 4. By the four summing circuits 34a,34b, 34c, and 34d, the four correction signals CB1, CB2, CB3, and CB4 are injected into respective ramp signal RAMP1, RAMP2, RAMP3, or RAMP4 so as to produce four modulated ramp signals RMP1, RMP2, RMP3, or RMP4 to be compared with the first control signal EO by the PWM comparators 20a, 20b, 20c, and 20d. The outputs of the PWM comparators 20a, 20b, 20c, and 20d will determine the duty cycle of each of the switches SWH1, SWL1, SWH2, SWL2, SWH3, SWL3, SWH4, and SWL4. The excess channel current will be cut by reducing the ON-duty and the insufficient channel current will be raised by increasing the ON-duty. The correction signal CB1, CB2, CB3, or CB4 modulates the ramp signal RAMP1, RAMP2, RAMP3, or RAMP4 either by shifting the DC offset of the ramp signal or increasing or decreasing the amplitude of the ramp signal. FIG. 5 shows the methodology that the correction signal shifts the DC offset of the ramp signal. When original saw-tooth wave with a ramp valley DC level H1 is compared with the first control signal EO, original PWM signal is produced. In the case of reducing the ON duty cycle, the correction signal shifts the saw-tooth wave upward and thus the DC offset of the saw-tooth wave becomes larger. Therefore, the saw-tooth wave has a new ramp valley DC level H2 larger than the original ramp valley DC level H1. As a result, smaller duty cycle PWM signal is obtained when the new saw-tooth wave is compared with the first control signal EO. Contrarily, in the case of increasing the ON duty cycle, the correction signal shifts the saw-tooth wave downward and thus the DC offset of the saw-tooth wave becomes smaller so as to obtain a new ramp valley DC level H3 smaller than the original ramp valley DC level H1. As a result, larger duty cycle PWM signal is generated when the new saw-tooth wave is compared with the first control signal EO. Another methodology is shown in FIG. 6 for scaling the ramp signal. When original saw-tooth wave with a ramp amplitude H4 is compared with the first control signal EO, original PWM signal is produced. In the case of reducing the ON duty cycle, the correction signal increases the amplitude of the saw-tooth wave to be H5 and thus smaller duty cycle PWM signal is obtained when the new saw-tooth wave is compared with the first control signal EO. Contrarily, in the case of increasing the ON duty cycle, the amplitude of the saw-tooth wave is decreased to H6 that is smaller than the original amplitude H4. As a result, larger duty cycle PWM signal is generated when the new saw-tooth wave is compared with the first control signal EO.

Figure 7:
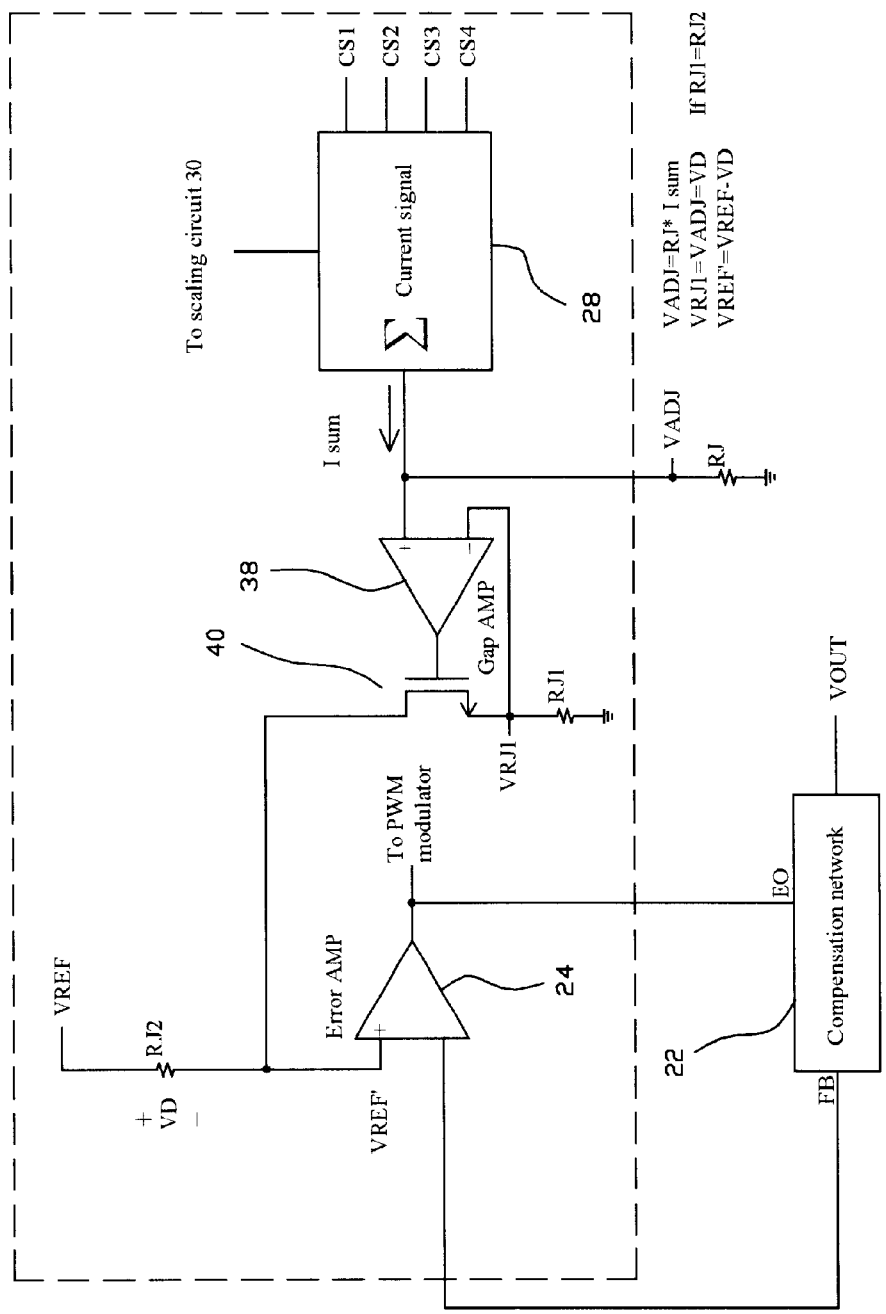
FIG. 7 shows an embodiment circuit for adjustable load regulation for the converter 10 shown in FIG. 2.

Referring to FIG. 1, the reference signal VREF' for the error amplifier 24 to be compared with the feedback signal FB is modified by a regulator, which is enlarged in FIG. 7. The summed channel current Isum generated by the summing circuit 28 is transformed to a load regulation voltage signal VADJ on an adjustable resistor RJ connected between the output of the summing circuit 28 and ground. A high-impedance unit gain buffer composed of gap amplifier 38 and MOS transistor 40 is employed to transform the load regulation voltage signal VADJ to a reference voltage drop VRJ1. The MOS transistor 40 is further connected to the reference voltage node VREF' and to a supply voltage VREF with resistor RJ2. Due to the current flowing through the resistor RJ1 is the same as that flowing through the resistor RJ2, if RJ2=RJ1, then the voltage drop across the resistor RJ2 is $$VD=VRJ1=VADJ=RJ \times Isum,$$

since $$VADJ=RJ \times Isum,$$
$$VRJ1=VADJ, \text{ and}$$
$$VRJ1/RJ1=VD/RJ2.$$

As a result, the reference signal $$VREF'=VREF-VD=VREF-RJ \times Isum.$$

That is, the reference signal VREF' for the input of the error amplifier 24 is regulated by the load current (i.e., Isum) from the actual system.

From the above, it should be understood that the embodiments described, in regard to the drawings, are merely exemplary and that a person skilled in the art may make variations and modifications to the shown embodiments without departing from the spirit and scope of the present invention. All variations and modifications are intended to be included within the scope of the present invention as defined in the appended claims.

What is claimed is:

1. A multi-phase DC-to-DC buck converter for transforming a supply voltage to a converter output voltage by splitting an input current to a plurality of channel currents, said converter comprising:

a voltage sense circuit for sensing said converter output voltage and generating a first sense signal;

a plurality of current sense circuits each for sensing a respective one of said plurality of channel currents and generating a respective second sense signal;

an error amplifier for comparing said first sense signal with a reference signal and generating a first error signal serving as a first control signal;

a first summing circuit for summing said plurality of second sense signals and generating a summed signal;

an averaging circuit for averaging said summed signal and generating an average signal;

a plurality of subtracting circuits each for subtracting said average signal from one of said plurality of second sense signals and generating a respective second error signal;

a plurality of second summing circuits each for adding one of said plurality of second error signals to a respective ramp signal and generating a respective second control signal; and a plurality of PWM comparators each for receiving said first control signal and one of plurality of second control signals and generating a PWM signal for regulating said channel current of said corresponding channel.

2. A converter according to claim 1 wherein said current sense circuit comprises:

a current sense resistor for producing a sensed voltage responsive to said channel current of said corresponding channel;

a differential input GM amplifier for transforming said sensed voltage to a current sense signal; and a sampling and holding circuit for transforming said current sense signal to said second sense signal.

3. A converter according to claim 1 further comprising a regulator for producing said reference signal under control of said summed signal.

4. A converter according to claim 3 wherein said regulator comprises:

an adjustable resistor for transforming said summed signal to a load regulation voltage signal;

a high-impedance unit gain buffer for transforming said load regulation voltage signal to a reference voltage drop;

means for producing an intermediate voltage in proportional to said reference voltage drop; and means for subtracting said intermediate voltage from a second supply voltage to produce said reference signal.

5. A method for balancing a plurality of channel currents in a multi-phase DC-to-DC buck converter transforming a supply voltage to a converter output voltage by splitting an input current to said plurality of channel currents, said method comprising the steps of:

sensing said converter output voltage to thereby determine a first sense signal;

sensing each of said plurality of channel currents to thereby determine a plurality of second sense signals;

comparing said first sense signal with a reference signal to thereby determine a first error signal serving as a first control signal;

summing said plurality of second sense signals to thereby determine a summed signal;

averaging said summed signal to thereby determine an average signal;

subtracting said average signal from each of said plurality of second sense signals to thereby determine a plurality of second error signals;

adding each of said plurality of second error signals to a respective ramp signal to thereby determine a plurality of second control signals;

generating a plurality of PWM signals by a plurality of PWM comparators each comparing said first control signal with one of said plurality of second control signals; and regulating said plurality of channel currents with said plurality of PWM signals.

6. A method according to claim 5 wherein said second control signal is obtained by shifting a DC offset of said ramp signal.

7. A method according to claim 5 wherein said second control signal is obtained by scaling an amplitude of said ramp signal.

8. A method according to claim 5 further comprising regulating said reference signal under control of said summed signal.

* * * * *